United States Patent
Wei et al.

(10) Patent No.: US 8,406,416 B2
(45) Date of Patent: Mar. 26, 2013

(54) CONFIGURING VIRTUAL NOISE PARAMETERS OF VERY HIGH-SPEED DIGITAL SUBSCRIBER LINE

(75) Inventors: Dong Wei, Austin, TX (US); Lihe Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 520 days.

(21) Appl. No.: 12/650,781

(22) Filed: Dec. 31, 2009

(65) Prior Publication Data

US 2010/0254528 A1 Oct. 7, 2010

Related U.S. Application Data (60) Provisional application No. 61/167,002, filed on Apr. 6, 2009.

(51) Int. Cl.
*H04M 9/08* (2006.01)

(52) U.S. Cl. .................. 379/406.06; 375/222

(58) Field of Classification Search ............... 379/22.08, 379/406.06, 417; 375/220, 222, 227, 254, 375/278, 285, 296, 346, 367; 370/201
See application file for complete search history.

(56) References Cited

U.S. PATENT DOCUMENTS

| | | | |
|---|---|---|---|
| 6,922,448 B1 | 7/2005 | Jacobsen et al. | |
| 7,039,125 B2 * | 5/2006 | Friedman | 375/297 |
| 2003/0123560 A1 * | 7/2003 | Jacobsen et al. | 375/260 |
| 2006/0062287 A1 * | 3/2006 | Van Bruyssel | 375/222 |
| 2008/0031313 A1 * | 2/2008 | Oksman | 375/222 |
| 2008/0084950 A1 * | 4/2008 | Long et al. | 375/346 |
| 2009/0041103 A1 * | 2/2009 | Shi | 375/222 |
| 2010/0208785 A1 * | 8/2010 | Lindqvist et al. | 375/227 |

FOREIGN PATENT DOCUMENTS

CN 1753442 A 3/2006

OTHER PUBLICATIONS

"Series G: Transmission Systems and Media, Digital Systems and Networks, Digital Sections and Digital Line System-Access Networks, Very High Speed Digital Subscriber Line Transceivers 2 (VDSL2) Amendment 2," ITUT G.993.2, Feb. 2008, 28 pages.

Foreign Communication From a Related Counterpart Application, European Application No. 10764078.1, Extended European Search Report dated Feb. 23, 2012, 8 pages.

Foreign Communication From a Related Counterpart Application, PCT Application No. PCT/CN2010/071565, International Search Report dated Jul. 1, 2010, 3 pages.

Foreign Communication From a Related Counterpart Application, PCT Application No. PCT/CN2010/071565, Written Opinion dated Jul. 1, 2010, 7 pages.

(Continued)

*Primary Examiner* — Md S Elahee
*Assistant Examiner* — Akelaw Teshale
(74) *Attorney, Agent, or Firm* — Conley Rose, P.C.; Grant Rodolph; Clint Wilkins (57) ABSTRACT

An apparatus comprising a transmitter configured to transmit a digital subscriber line (DSL) signal in a line from a plurality of subscriber lines according to a reference virtual noise power spectral density (PSD), wherein the reference virtual noise PSD is based on an upper bound for a worst-case far-end crosstalk (FEXT) PSD in the subscriber lines. Also included is an apparatus comprising at least one processor configured to implement a method comprising obtaining an upper bound for a worst-case FEXT PSD for a plurality of subscriber lines, obtaining a referred virtual noise PSD based on the worst-case FEXT PSD for the lines, and determining a bit-loading for the lines based on the referred virtual noise or a scaled version of the receiver-referred virtual noise.

17 Claims, 5 Drawing Sheets

OTHER PUBLICATIONS

Wang, K., "Key Technologies for Crosstalk Cancellation in VDSL2," Modern Science & Technology of Telecommunications, Mar. 2007, pp. 52-58.

"Series G: Transmission Systems and Media, Digital Systems and Networks—Digital Sections and Digital Line System—Access Networks—Asymmetric Digital Subscriber Line (ADSL) Transceivers—Extended Bandwidth ADSL2 (ADSL2plus)," ITU-T G.992.5, (Jan. 2009).

"Series G: Transmission Systems and Media, Digital Systems and Networks—Digital Sections and Digital Line System—Access Networks—Very High Speed Digital Subscriber Line Transceivers," ITU-T G.993.2, (Feb. 2006).

Schelstraete, Sigurd, "Defining Upstream Power Backoff for VDSL," IEEE Journal on Selected Areas in Communication, vol. 20, No. 5, Jun. 2002, pp. 1064-1074.

Jacobsen, Krista S., "Methods of Upstream Power Backoff on Very High-Speed Digital Subscriber Lines," Topics in Broadband Access, IEEE Communications Magazine, Mar. 2001, pp. 201-216.

Tno, "G.vdsl: G.PLOAM: Upstream Virtual Noise is incompatible with UPBO," ITU-T SG15 Contribution C-59-E, Geneva, Switzerland, Nov. 2008.

British Telecom, "G.gen: G.vdsl: ADSL: Virtual noise methods," ITU-T Q4/SG15 Contribution 09AG-046R1, Atlanta, GA, U.S.A., Feb. 2009.

* cited by examiner

CONFIGURING VIRTUAL NOISE PARAMETERS OF VERY HIGH-SPEED DIGITAL SUBSCRIBER LINE

CROSS-REFERENCE TO RELATED APPLICATIONS

The present application claims priority to U.S. Provisional Patent Application No. 61/167,002 filed Apr. 6, 2009 by Dong Wei, et al. and entitled, "Configuring Virtual Noise Parameters of Very High-Speed Digital Subscriber Line," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide relatively large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk limits the performance of some DSL technologies, such as asymmetric DSL 2 (ADSL2) and very high bit rate DSL 2 (VDSL2). For example, significant levels of crosstalk can occur because of the relatively high frequencies used in VDSL2. Crosstalk can occur in mixed deployment scenarios, where cabinet and exchange deployed lines operate within relatively short proximity or in the same binder. As such, relatively high power transmissions on shorter lines or loops (e.g. deployed by the cabinet) can result in relatively high levels of "far-end" crosstalk (FEXT) on longer loops (e.g. deployed by the exchange). To reduce the crosstalk for upstream transmissions, e.g. to the cabinet and/or exchange, a spectrum management technique referred to as upstream power back-off (UPBO) can be used. The UPBO technique reduces the upstream transmit power spectral density (PSD) on shorter loops. Hence, the upstream transmission PSDs and the FEXT can be equalized, e.g. become weakly dependent on loop characteristics, such as loop length.

The crosstalk can be highly non-stationary and vary dramatically as lines within the binder are activated and deactivated. Such rapidly varying noise environment causes frequent re-initializations of the lines, loss of service, and low customer satisfaction. One method for increasing the stability of digital subscriber lines is using virtual noise, a technique that limits the maximum bit-loading allowed on each tone. Virtual noise is used to improve DSL stability by ensuring operation of a line at a bit-loading level that can be sustained in worse noise conditions. The performance of a DSL is substantially dependent on the virtual noise configuration for the line. For example, if the virtual noise is set too low, the line becomes unstable. Alternatively, if the virtual noise is set too high, the line's data-rate is unnecessarily reduced. Using both the virtual noise technique and the UPBO technique to reduce crosstalk in the lines is desirable but has complications due to compatibility issues between the two techniques.

SUMMARY

In one embodiment, the disclosure includes an apparatus comprising a transmitter configured to transmit a DSL signal in a line from a plurality of subscriber lines according to a reference virtual noise PSD, wherein the reference virtual noise PSD is based on an upper bound for a worst-case FEXT PSD in the subscriber lines.

In another embodiment, the disclosure includes an apparatus comprising at least one processor configured to implement a method comprising obtaining an upper bound for a worst-case FEXT PSD for a plurality of subscriber lines, obtaining a referred virtual noise PSD based on the worst-case FEXT PSD for the lines, and determining a bit-loading for the lines based on the referred virtual noise or a scaled version of the receiver-referred virtual noise.

In yet another embodiment, the disclosure includes a method comprising equalizing a FEXT PSD in a plurality of subscriber lines, and adjusting a referred virtual noise PSD in the subscriber lines to match the equalized FEXT PSD.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for configuring virtual noise in DSL systems that comprise a combination of relatively shorter loops and relatively longer loops. The virtual noise may be configured in a plurality of subscriber lines based on a FEXT in the lines, for instance which may be equalized using a UPBO technique. Accordingly, an upper bound for a worst-case FEXT PSD in the lines may be obtained, and hence used to determine a receiver-referred virtual noise PSD, which may be the same for all the lines. Since the obtained FEXT PSD may be substantially independent of the loop length of the lines, the determined receiver-referred virtual noise PSD may also be substantially independent of the loop length of the lines. As such, the receiver-referred virtual noise PSD may be configured the same for all the lines, which may have different loop lengths. The receiver-referred virtual noise PSD may also match the FEXT PSD in the lines for different loop lengths, which may provide compatibility between the UPBO technique and the virtual noise technique.

Figure 1:
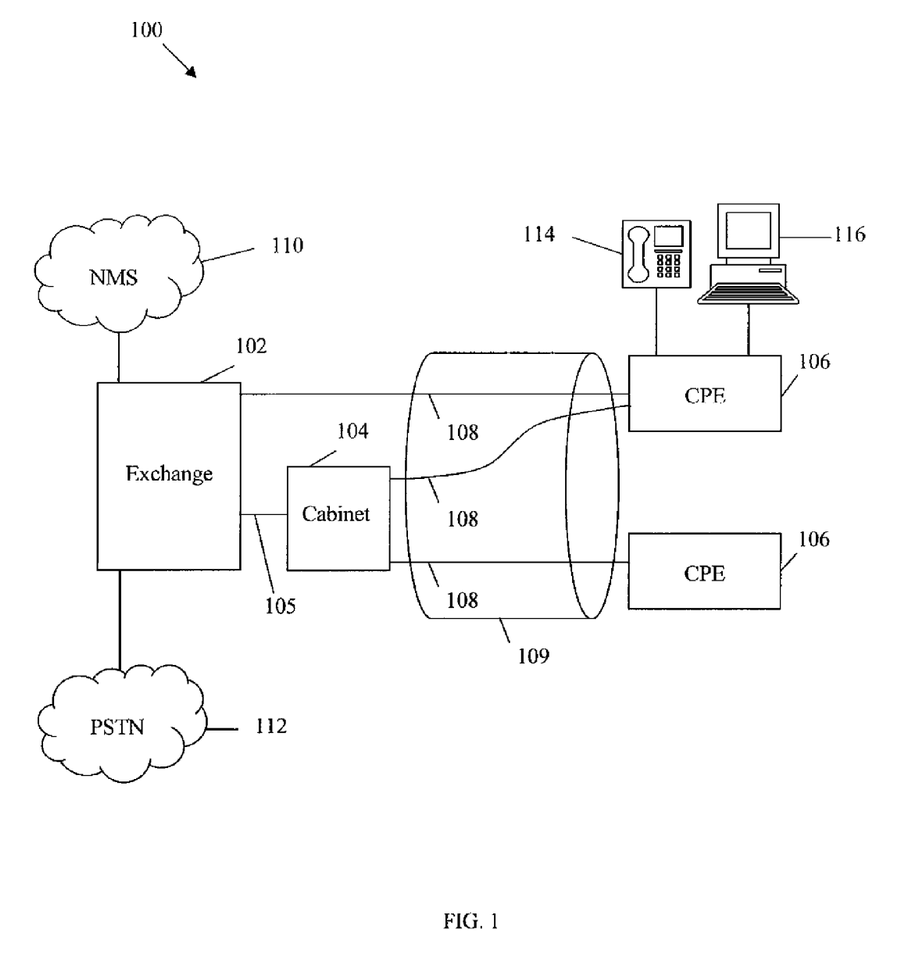
FIG. 1 is a schematic diagram of an embodiment of a DSL system.

FIG. 1 illustrates one embodiment of a DSL system 100. The DSL system 100 may be a VDSL system, a VDSL2 system, or any other DSL system. The DSL system 100 may comprise an Exchange 102, a Cabinet 104 coupled to the Exchange 102 by an optical link 105, and a plurality of customer premise equipments (CPEs) 106, which may be coupled to the Exchange 102 and/or the Cabinet 104 via a plurality of subscriber lines 108. At least some of the subscriber lines 108 may be bundled in a binder 109. Additionally, the DSL system 100 may optionally comprise a network management system (NMS) 110 and a public switched telephone network (PSTN) 112, which may be coupled to the Exchange 102. In other embodiments, the DSL system 100 may be modified to include splitters, filters, management entities, and various other hardware, software, and functionality.

In an embodiment, the Exchange 102 may be a server located at a central office and may comprise a splitter, which may couple the NMS 110, the PSTN 112, and the subscriber lines 108. Additionally, the Exchange 102 may comprise a plurality of DSL transmitters/receivers (transceivers), which may exchange signals between the NMS 110, the PSTN 112, and the subscriber lines 108. The NMS 110 may be a network management infrastructure that processes data exchanged with the Exchange 102 and may be coupled to one or more broadband networks, such as the Internet. The PSTN 112 may be a network that generates, processes, and receives voice or other voice-band signals. For instance, the splitter may be a 2:1 coupler that forwards data signals received from the subscriber lines 108 to the NMS 110 and the PSTN 112, and forwards data signals received from the NMS 110 and the PSTN 112 to the subscriber lines 108. The signals may be received and transmitted using the DSL transceiver, such as a modem. Further, the splitter may optionally comprise one or more filters to help direct data signals between the NMS 110, the PSTN 112, and the subscriber line 108. In an embodiment, the DSL transceiver may comprise a forward error correction (FEC) codeword generator that generates FEC data, an interleaver that interleaves the transmitted data across a plurality of tones, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the Exchange 102 may be configured to transmit data at similar or different rates for each subscriber line 108.

In an embodiment, the Cabinet 104 may be located at a distribution center between the central office (CO) and customer premises and may comprise a splitter, which may couple the Exchange 102 to the CPEs 106. For instance, the Cabinet 104 may comprise a DSL access multiplexer (DSLAM) that couples the Exchange 102 to the CPEs 106. Additionally, the Cabinet 104 may comprise a plurality of DSL transceivers, which may be used to exchange signals between the Exchange 102 and the CPEs 106. The DSL transceiver may process the received signals or may simply pass the received signals between the CPEs 106 and the Exchange 102. The splitter in the Cabinet 104 may be a N:1 coupler (N is an integer) that routes data signals received from the Exchange 102 to N CPEs 106, and routes data signals received from the N CPEs 106 to the Exchange 102. The data signals may be transmitted and received using the DSL transceiver, which may be a modem. Further, the splitter of the Cabinet 104 may optionally comprise one or more filters to help direct data signals between the Exchange 102 and the CPEs 106 via the corresponding subscriber lines 108. In an embodiment, the DSL transceiver may be configured to transmit data to the CPEs 106 at similar or different rates and/or power for each subscriber line 108, as described in detail below.

In an embodiment, the CPEs 106 may be located at the customer premises, where at least some of the CPEs 106 may be coupled to a telephone 114 and/or a computer 116. The telephone 114 may be hardware, software, or both that generates, processes, and receives voice or other voice-band signals. The CPE 106 may comprise a splitter, which may couple the subscriber lines 108 and the telephone 114 and the computer 116. The CPE 106 may also comprise a DSL transceiver to exchange data between the CPE 106 and the Exchange 102 via the subscriber line 108. For instance, the splitter may be a 2:1 coupler that forwards data signals received from the subscriber line 108 to the telephone 114 and the DSL transceiver, and forwards data signals received from the telephone 114 and the DSL transceiver to the subscriber line 108. The splitter may optionally comprise one or more filters to help direct data signals to and from the telephone 114 and the DSL transceiver. The DSL transceiver, e.g. a modem, may transmit and receive signals through the subscriber lines 108. For instance, the DSL transceiver may process the received signals to obtain the transmitted data from the Exchange 102, and pass the received data to the telephone 114, the computer 116, or both. The CPEs 106 may be coupled to the Exchange 102 directly via the subscriber lines 108 and/or via the subscriber lines 108 and the Cabinet 104. For example any of the CPEs 106 may be coupled to a subscriber line 108 from the Exchange 102 and/or a subscriber line 108 from the Cabinet 104. The CPEs 106 may access the NMS 110, the PSTN 112, and/or other coupled networks via the subscriber lines 108 deployed by the Exchange 102 and/or the Cabinet 104, which may be bundled in the binder 109.

In an embodiment, the subscriber lines 108 may be telecommunications paths between the Exchange 102 and the CPE 106 and/or between the Cabinet 104 and the CPEs 106, which may comprise one or more twisted-pairs of copper cable. Crosstalk interference may occur between the tones or signals transported through the subscriber lines 108 that are deployed by the Exchange 102 and the Cabinet 104, e.g. in the binder 109. The crosstalk interference may be related to the power, frequency, and travel distance of the transmitted signals and may limit the communications performance in the network. When the PSD of the transmitted signals increase, e.g. over a range of frequencies, the crosstalk between the adjacent subscriber lines 108 may increase and hence the data-rates may decrease.

Figure 2:
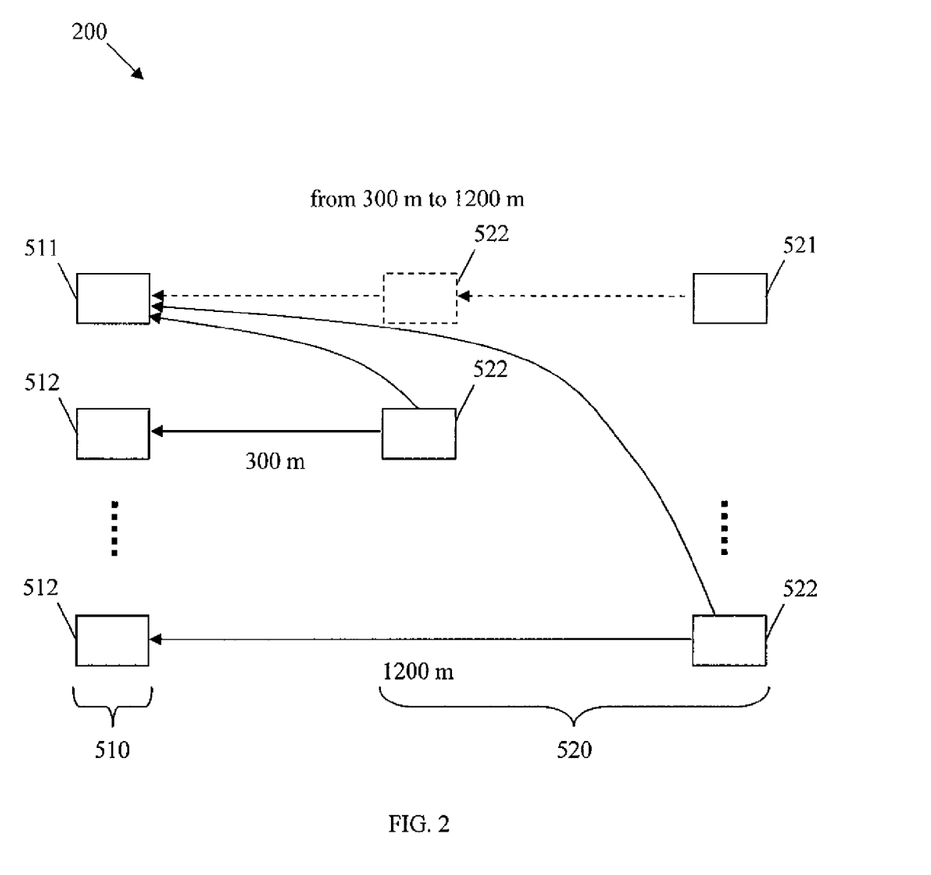
FIG. 2 is a schematic diagram of an embodiment of an upstream transmission scenario.

FIG. 2 illustrates one embodiment of an upstream transmission scenario 200 in a DSL system, for instance similar to the DSL system 100. The DSL system may comprise a plurality of receivers (or transceivers) 510, which may be coupled to a plurality of transmitters (or transceivers) 520 via a plurality of lines, which may be 26-American wire gauge (AWG) copper lines. The receivers 510 may be located at an Exchange, for example in a modem or a DSL access multiplexer (DSLAM). For example, the receivers 510 may be a VDSL2 transceiver unit at the operator end of the line (VTU-O). In some embodiments, the receivers 510 may be distributed between the Exchange and a Cabinet positioned between the Exchange and a plurality of CPEs. The transmitters 520 may be located at the CPEs coupled to the Exchange and/or the Cabinet. In some embodiments, some of the transmitters 520 may be located at the Cabinet. As such, the lines coupled to the Exchange and/or the Cabinet may have different loop lengths. The lines that have relatively shorter loop lengths may be referred to as short loops and the lines that have relatively longer loop lengths may be referred to as long loops. The signals transmitted in the lines, e.g. from the CPEs to the Cabinet and the Exchange, e.g. in the same binder, may suffer from crosstalk. A line that receives crosstalk interference or noise from other lines may be referred to as a victim line and the other lines that contribute to the crosstalk may be referred to as disturber lines. For example, a receiver 511 may receive an upstream signal from a transmitter 521 via a victim line between the receiver 511 and the transmitter 521. The upstream signal in the victim line may be affected by crosstalk or noise introduced by other upstream signals transmitted in a plurality of disturber lines between a plurality of receivers 512 and a plurality of transmitters 522.

For instance, the upstream signals that are transmitted at full power or relatively high power on shorter lines may cause relatively high levels of FEXT on longer loops. Typically, a VDSL2 transceiver unit at the remote site (VTU-R), e.g. at the CPE, may use UPBO to improve spectral compatibility between signals in different loops. The UPBO scheme may be used according to International Telecommunication Union (ITU) Telecommunication Standardization Sector (ITU-T) G.993.2 standard for VDSL2, which is incorporated herein by reference as if reproduced by its entirety. As such, the VTU-R may estimate the electrical length of a corresponding loop, $kl_0$, and hence use the estimated electrical length to calculate a UPBO PSD mask, UPBOMASK:

$$UPBOMASK(kl_0) = UPBOPSD(f) + LOSS(kl_0,f) + 3.5 \ [dBm/Hz], \quad (1)$$

where $LOSS(kl_0,f)$ is a loss factor in decibel (dB), UPBOPSD (f) is a UPBO PSD in dB per milliwatt per Hertz (dBm/Hz) that may be independent of loop length and type, and f is a frequency in Megahertz (MHz). The loss factor and the UPBO PSD may be calculated by:

$$LOSS(kl_0,f) = kl_0\sqrt{f}\,[dB],$$

$$UPBOPSD(f) = -a - b\sqrt{f}\,[dBm/Hz].$$

The constants a and b values may be different for different upstream frequencies or bands and may be provided to the VTU-R by the central office management information base (CO-MIB), e.g. upon initiation of communications.

In some cases, the crosstalk interference between the lines may be highly non-stationary, e.g. during activation and/or deactivation of the lines, which may cause rapidly varying noise conditions and reduce line stability. To guarantee sufficient line stability during rapidly varying noise conditions, e.g. in upstream transmissions, the signals in the lines may be configured using virtual noise. For instance, the receiver 511 (or any receiver 512) may receive a DSL signal whose bit loading is based on a transmitter referred virtual noise, TXREFVN. The transmitter referred virtual noise may be sent by the transmitter 521 (or any transmitter 522) and may then be used to determine a received virtual noise PSD, Received_Virtual_Noise_PSD, according to the G.993.2 standard:

$$\text{Received\_Virtual\_Noise\_}PSD = |H(f)|^2 \times TXREFVN. \quad (2)$$

Typically, a single TXREFVN PSD may be provided or set by a CO management information base (CO-MIB) for all or at least some of the lines (for a range of frequencies or band). As such, the received virtual noise PSD for a line may depend on the line or loop transfer function H(f). However, when a UPBO scheme is also used to equalize the received FEXT in the lines or loops, the received FEXT may be independent of the line or loop transfer function. Therefore, the received virtual noise PSD may not match the received FEXT for all the lines or loops, which results in incompatibility between using the transmitter referred virtual noise and the UPBO for the same lines.

In an embodiment, to improve the compatibility between the virtual noise and UPBO techniques, the received virtual noise PSD may be configured based on an upper bound for a worst-case FEXT PSD, such as a 99 percent worst-case FEXT PSD. As such, the received virtual noise PSD may be determined for a plurality of loops and may be independent of the line or loop transfer function, similar to the received FEXT. Since, a single received virtual noise PSD may be used for a plurality of lines, the received virtual noise PSD may be matched to the received FEXT for the same lines or loops. Hence, the incompatibility issue between the two techniques may be eliminated.

To obtain the 99 percent worst-case FEXT PSD received by a victim line 0 in the upstream direction, an upstream transmitted PSD in a disturber line i, $Tx\_PSD_i$, may be calculated by:

$$Tx\_PSD_i(f) = (-a - b\sqrt{f}) - 20 \times \log_{10}|H(f,L_i)|, \quad (3)$$

where $Tx\_PSD_i$ is in dBm/Hz and $L_i$ is the loop length of the line i. Thus, the 99 percent worst-case FEXT of line i that is coupled into line 0, $FEXT_0$, (e.g. in dBm/Hz), may be obtained by:

$$FEXT_{0,i}(f) = 10 \times \log_{10}(k \times CL \times f^2) + 20 \times \log_{10}|H(f,CL) + Tx\_PSD_i(f)|, \quad (4)$$

where k is a FEXT coupling constant and CL is a maximum coupling length between line i and line 0. In a first case where CL may be equal to about $L_i$ and $L_i$ may be less than or equal to about $L_0$, the worst-case FEXT PSD may be evaluated based on the loop lengths of line i ($L_i$) and the loop length of line 0 ($L_0$) by:

$$FEXT_{0,i}(f) = 10 \times \log_{10}(k \times L_i \times f^2) + (-a - b\sqrt{f}) \leq \\ 10 \times \log_{10}(k \times L_0 \times f^2) + (-a - b\sqrt{f}). \quad (5)$$

Alternatively, in a second case where CL may be equal to about $L_0$ and $L_i$ may be greater than about $L_0$, the worst-case FEXT PSD may be obtained by:

$$FEXT_{0,i}(f) = 10 \times \log_{10}(k \times L_0 \times f^2) + 20 \times \log_{10}|H(f, L_0)| + \\ 20\log_{10}|H(f, L_i - L_0)| + (-a - b\sqrt{f} - 20\log_{10}|H(f, L_i)|) \\ = 10 \times \log_{10}(k \times L_0 \times f^2) + (-a - b\sqrt{f}). \quad (6)$$

Combining the first case and the second case, an upper bound for the worst-case FEXT PSD may be obtained by:

$$FEXT_{0,i}(f) \leq 10 \times \log_{10}(k \times L_0 \times f^2) + (-a - b\sqrt{f}). \quad (7)$$

The upper bound for the worst-case FEXT PSD of a plurality of disturber lines i coupled into the line 0 may be calculated using a full service access network (FSAN) method:

$$FEXT_{0,i}(f) \leq |10 \times \log_{10}(k \times n^{0.6} \times f^2) + (-a - b\sqrt{f}) + 10 \times \log_{10}L_0, \quad (8)$$

where n is the quantity of disturber lines, which may be configured by the operator based on a deployment scenario.

A reference virtual noise PSD, REFVN_dB, may then be determined, e.g. by the CO-MIB, based on the upper bound for the worst-case FEXT PSD:

$$REFVN\_dB = |10 \times \log_{10}(k \times n^{0.6} \times f^2) + (-a - b\sqrt{f})|, \quad (9)$$

where REFVN_dB is in dB. Since, the right-hand side of equation (9) may be independent of loop characteristics, a single reference virtual noise PSD may be set for a plurality of lines in the system, e.g. all the lines in the binder, and thus virtual noise configuration may not be needed on a line-by-line basis. Accordingly, instead of using equation (2), the received virtual noise PSD for a line having a loop length $L_0$ may be calculated by:

$$\text{Received\_Virtual\_Noise\_PSD} = \text{REFVN\_dB} + 10 \times \log_{10} L_0. \qquad (10)$$

The received virtual noise PSD obtained using equation (10) may be a scaled version of the reference virtual noise PSD, which may be configured by the CO-MIB, where the term $10 \times \log_{10} L_0$ may be replaced by a generic scaling factor term. In an embodiment, equation (9) may be written in terms of a virtual noise factor and a noise scaling factor:

$$\text{REFVN\_dB} = 20 \times \log_{10} f + (-a - b\sqrt{f}) + \text{scaling\_factor\_1}, \qquad (20)$$

where $20 \times \log_{10} f + (-a - b\sqrt{f})$ is the virtual noise factor and scaling_factor_1 is the noise scaling factor, which may be equal to about $10 \times \log_{10}(k \times n^{0.6})$. Alternatively, a different value may be used for the noise scaling factor to determine the referred virtual noise PSD.

Using a single reference virtual noise PSD corresponding to an upper bound for the worst-case FEXT PSD in a plurality of lines to configure the received virtual noise PSD may be desirable since it may improve compatibility between using the UPBO and the virtual noise schemes to reduce crosstalk effects in the system. Accordingly, a single (equalized) received FEXT and a corresponding received virtual noise PSD may be used in the lines. Additionally, the received virtual noise PSD may be configured based on a single reference virtual noise PSD to reduce extrinsic noise in the lines, such as radio frequency interference, in the upstream direction. For instance, the reference virtual noise PSD of equation (9) may comprise an additional term, such as a received extrinsic noise PSD, to accommodate for the extrinsic noise in the lines:

$$\text{REFVN} = f^2 \times 10^{\frac{-a-b\sqrt{f}+\text{scaling\_factor\_1}}{10}} + \text{extrinsic\_noise\_PSD},$$

$$\text{REFVN\_dB} = 10 \times \log_{10} \text{REFVN}$$

Alternatively, a different value may be used for the extrinsic noise in the line.

Figure 3:
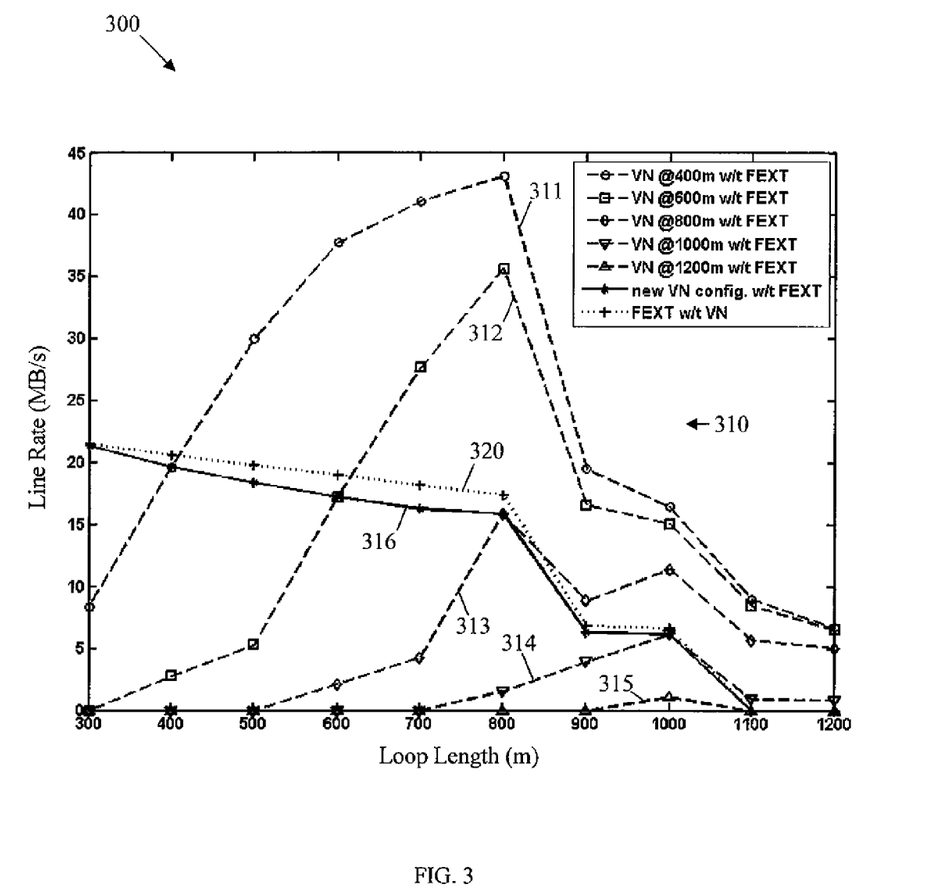
FIG. 3 is a chart of an embodiment of virtual noise configurations.

FIG. 3 illustrates an embodiment of a plurality of virtual noise configurations 300, which were obtained by simulation of upstream transmissions for a victim line according to a plurality of conditions. The victim lines may be affected by crosstalk interference from a plurality of disturbing lines. The lines (victim line and disturbing lines) may couple a plurality of transmitters to a plurality of receivers in a DSL system similar to the DSL system of the upstream transmission scenario 200. The victim line loop lengths range from about 300 meters (m) to about 1,200 m at about 100 m increments. The lines also comprise about 20 disturber lines that contribute to the crosstalk in the victim lines. The disturber lines comprise about ten disturber lines having loop lengths equal to about 300 m and about ten other disturber lines having loop lengths equal to about 1200 m.

The virtual noise configurations 300 may be characterized by a plurality of curves 310, which comprise a plurality of points obtained using various parameters in the simulation. The simulation parameters and their values are shown in Table 1. The simulation parameters comprise a signal-to-noise ratio (SNR) margin, a SNR gap, a net coding gain, a Background noise level and UPBO parameters. The points in the curves 310 correspond to a plurality of line rates (e.g. y-axis) vs. a plurality of loop lengths (e.g. x-axis) for the victim lines. The line rates correspond to the bit-loading based on the virtual noise configuration and are shown in Megabits per second (Mb/s), and the loop lengths of the victim lines are shown in meters.

TABLE 1

| Parameter | | Value |
|---|---|---|
| US0 | | not used |
| SNR margin | | 6 dB |
| SNR gap | | 9.8 dB |
| net coding gain | | 5 dB |
| background noise level | | −135 dBm/Hz |
| UPBO parameters | a | 46.3 (US1) |
| | | 49.3 (US2) |
| | b | 23.3 (US1) |
| | | 18.3 (US2) |
| | reference length | 1000 m (US1) |
| | | 800 m (US2) |

The curves 310 comprise a plurality of curves 311, 312, 313, 314, and 315 obtained by simulation using a virtual noise configuration based on a transmitter referred virtual noise (TXREFVN), without matching between the virtual noise PSD and the FEXT in the lines. The curves 311, 312, 313, 314, and 315 were obtained using different TXREFVN PSDs designed for about 400 m, about 600 m, about 800 m, about 1000 m, and about 1200 m loop lengths. The curves 310 also include a curve 316 that was obtained by simulation using a virtual noise configuration based on a single reference virtual noise PSD (REFVN_dB). The reference virtual noise PSD is obtained using an upper bound for the 99 percent worst-case FEXT PSD for all the lines, e.g. using equation (9). Accordingly, the curve 316 represents a virtual noise configuration that may match between the virtual noise PSD and the FEXT in the lines. Additionally, a curve 320 is shown in FIG. 3, which comprises a plurality of points that represent a bit-loading according to the FEXT from the disturber lines, without using a virtual noise configuration. The FEXT may reflect the noise level coupled from the disturber lines into the victim lines. The curve 320 may be used as a reference curve to evaluate the performance of the different virtual noise configurations with respect to the line conditions due to FEXT.

In each one of the curves 311, 312, 313, 314, and 315, the line rates were obtained using a TXREFVN PSD based on one design loop length (e.g. about 400 m, about 600 m, about 800 m, about 1000 m, and about 1200). Each of the curves 311, 312, 313, 314, and 315 may comprise a low line rate portion and a high line rate portion with respect to the curve 320, e.g. the line rates due to FEXT. The low rate portion may be found where the line rates obtained using the TXREFVN PSD are less than about the corresponding design loop length, and the high rate portion may be found where the line rates obtained using TXREFVN PSD are greater than about the corresponding design loop length. As shown in FIG. 3, the bit-loading in the low rate portion and the bit-loading in the high rate portion of the curves 311, 312, 313, 314, and 315 may not match the bit-loading caused by the FEXT in the victim lines. The low rate portion in each of the curves 311, 312, 313, 314, and 315 (e.g. below curves 316 and 320) may indicate lower line bit-loading with respect to the FEXT bit-loading and therefore unnecessary over-protection of the victim lines. Alternatively, the high rate portion in the curves 311, 312, 313, 314, and 315 (e.g. above curves 316 and 320) may indicate higher line bit-loading and therefore possible under-protection of the victim lines. Thus, the virtual noise configurations corresponding to the curves 311, 312, 314, and 315 may not be suitable for deployment scenarios comprising longer loops and shorter loops.

The lines rates in the curve 316 were obtained by matching between the virtual noise PSD and the FEXT in the victim lines, e.g. based on the 99 percent worst-case FEXT PSD for all the lines. As such, the line rates in the curves 316 may be substantially close in value to the line rates of the curve 320, e.g. in comparison to the remaining curves, which may indicate sufficient protection of the victim lines for the range of considered loop lengths. Hence, using the virtual noise configuration based on a single reference virtual noise PSD that matches the worst-case FEXT PSD for all the lines may be advantageous for deployment scenarios comprising longer loops and shorter loops, e.g. in comparison to other virtual noise configurations. The virtual noise configuration based on a single reference virtual noise PSD may also be compatible with the UPBO scheme to equalize the FEXT in the lines, e.g. achieve about the same FEXT in the lines.

Figure 4:
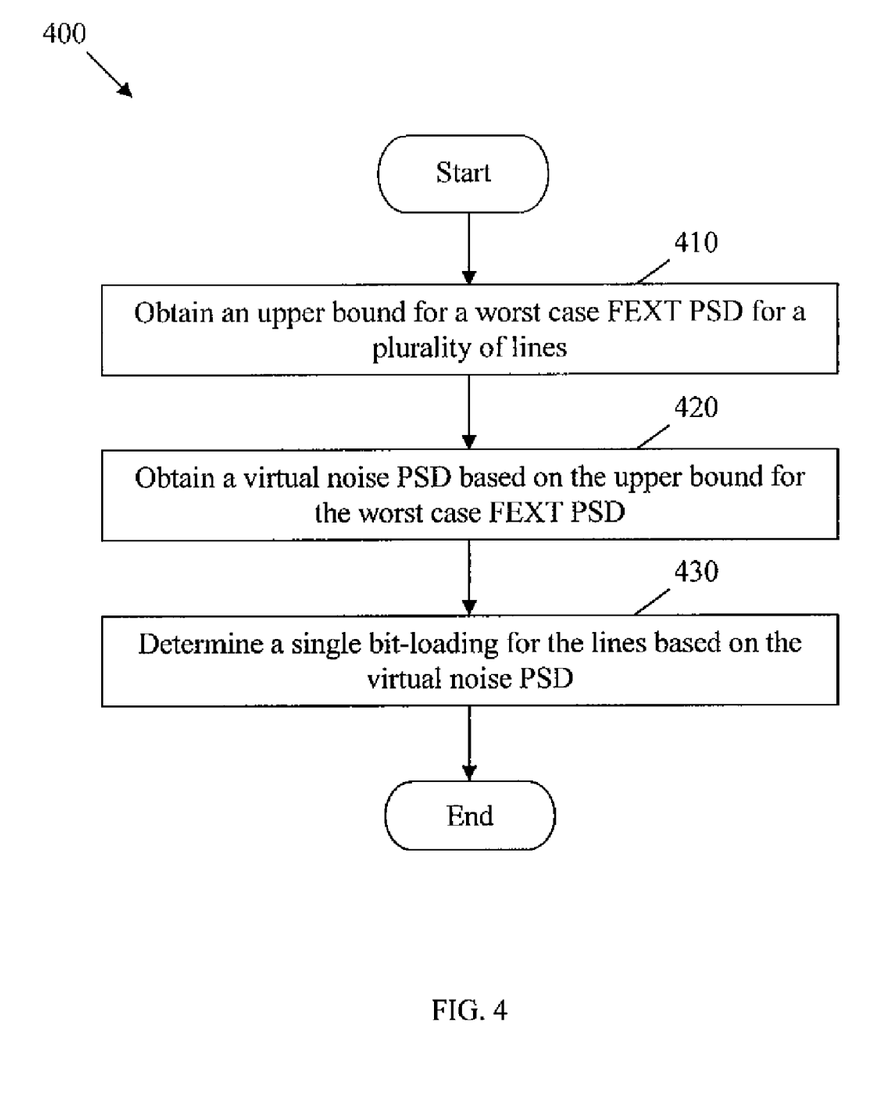
FIG. 4 is a flowchart of an embodiment of a virtual noise configuration method.

FIG. 4 illustrates an embodiment of a virtual noise configuration method 400, which may be used to obtain a virtual noise PSD for a plurality of lines that matches a FEXT PSD in the lines. Accordingly, the virtual noise configuration method 400 may be used along with an UPBO scheme to reduce crosstalk effects, e.g. for upstream transmissions to an Exchange and/or Cabinet. For example, the virtual noise configuration method 400 may be used in a DSL system such as the DSL system 100 and/or for upstream transmission scenarios, such as the upstream transmission scenario 200. In an embodiment, a CO-MIB in the DSL system may use the method 400 to configure a referred virtual noise PSD or template for a plurality of transmitters, e.g. in the upstream direction.

The method 400 may begin at block 410, where an upper bound for a worst-case FEXT PSD may be obtained for a plurality of lines. For example, a 99 percent worst-case FEXT PSD may be obtained for n lines using equation (8) based on the FSAN method. Next, at block 420, a virtual noise PSD based on the upper bound for the worst-case FEXT PSD may be obtained. For example, a reference virtual noise PSD may be obtained for the n lines using equation (9) and the 99 percent worst-case FEXT PSD. The reference virtual noise PSD may also be used to determine a received virtual noise PSD in the lines, for example using equation (10). Next, at block 430, a single bit-loading may be determined for the lines based on the virtual noise PSD. The method 400 may then end. In some embodiments, the virtual noise configuration method 400 may be used to reduce crosstalk effects in the lines with an UPBO scheme to equalize the received FEXT in the lines. As such, the single bit-loading for the lines, e.g. in the upstream direction, may be matched to about the data-rate in the lines, which may correspond to the equalized FEXT in the lines.

Figure 5:
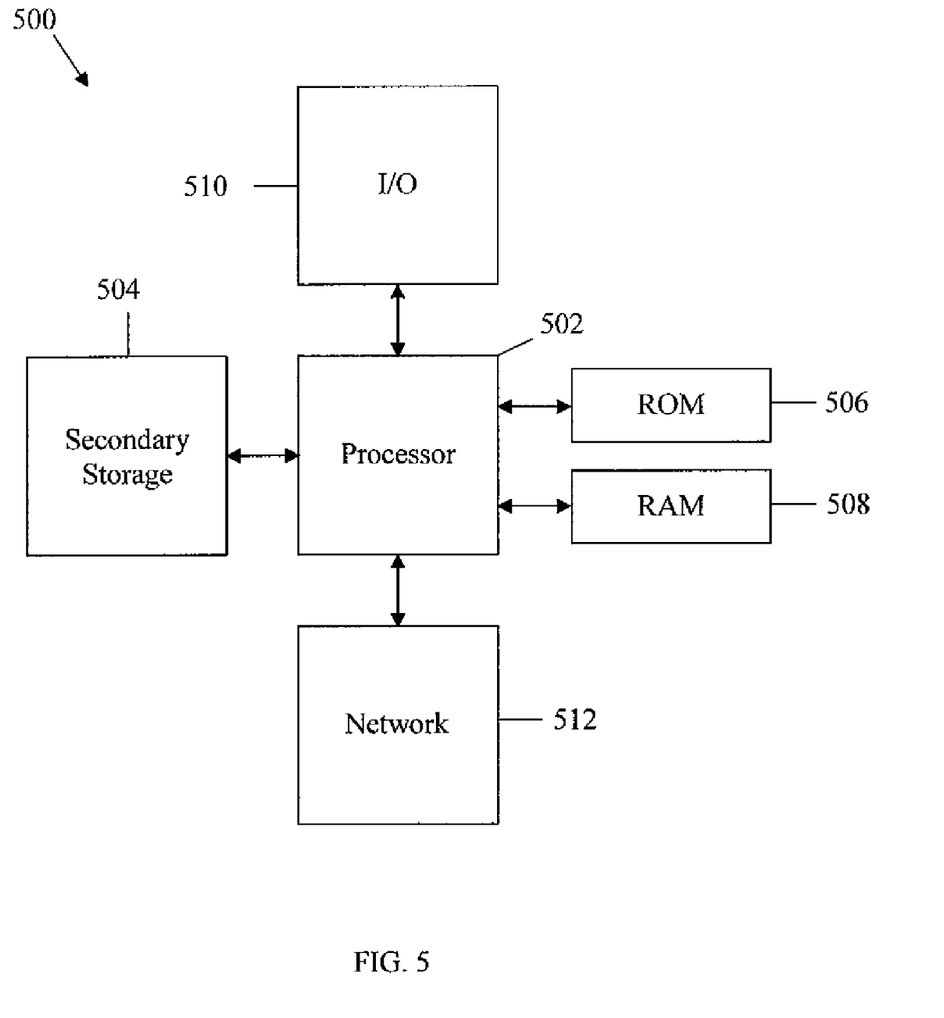
FIG. 5 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 may include a processor 502 (which may be referred to as a central processor unit or CPU) that is in communication with any memory devices including secondary storage 504, read only memory (ROM) 506, random access memory (RAM) 508, input/output (I/O) devices 510, and network connectivity devices 512, or combinations thereof. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a processor configured to obtain an upper bound for a worst-case far-end crosstalk (FEXT) power spectral density (PSD) for a victim line in a plurality of subscriber lines, wherein obtaining the upper bound for the worst-case FEXT PSD comprises determining a 99 percent worst-case FEXT PSD in the victim line from a plurality of disturbing lines $FEXT_{0,i}$ by $$FEXT_{0,i}(f) \leq |10 \times \log_{10}(k \times n^{0.6} \times f^2) + (-a - b\sqrt{f})| + 10 \times \log_{10} L_0,$$

where k is a FEXT coupling constant, n is a quantity of the disturber lines, f is a frequency, a and b are upstream power back-off (UPBO) parameters determined by an operator, and $L_0$ is a loop length of the victim line: and
a transmitter configured to transmit a digital subscriber line (DSL) signal in the victim line according to a reference virtual noise power spectral density (PSD),
wherein the reference virtual noise PSD is based on the upper bound.

2. The apparatus of claim 1, wherein the subscriber lines couple a plurality of customer premise equipments (CPEs) to an exchange and/or a cabinet site, wherein the subscriber lines have different loop lengths, and wherein the subscriber lines comprise relatively shorter loops and relatively longer loops.

3. The apparatus of claim 1, wherein the FEXT PSDs in the subscriber lines are equalized using a UPBO technique.

4. The apparatus of claim 3, wherein a VDSL2 transceiver unit at a remote site (VTU-R) is coupled to any of the subscriber lines and is configured to use UPBO to equalize the FEXT PSD.

5. The apparatus of claim 1, wherein a VDSL2 transceiver unit at the operator's end of the line (VTU-O) is coupled to the line and is configured to receive the DSL, signal and determine a received virtual noise PSD corresponding to the receiver-referred virtual noise PSD.

6. The apparatus of claim 1, wherein the transmitter is coupled to a central office (CO) management information base (CO-MIB) configured to determine the reference virtual noise PSD.

7. An apparatus comprising:
at least one processor configured to:
obtain an upper bound for a worst-case far-end crosstalk (FEXT) power spectral density (PSD) for a victim line in a plurality of subscriber lineS;
obtain a receiver-referred virtual noise PSD based on the upper bound; and
determine a bit-loading for the victim line based on the receiver-referred virtual noise PSD or a scaled version of the receiver-referred virtual noise PSD,
wherein Obtaining the upper bound for the worst-case FEXT PSD comprises determining a 99 percent worst-case FEXT PSD in the victim line from a plurality of disturbing lines, $FEXT_{0,i}$, by $$FEXT_{0,i}(f) \leq |10 \times \log_{10}(k \times n^{0.6} f^2) + (-a - b\sqrt{f})| + 10 \times \log_{10} L_0,$$

where k is a FEXT coupling constant, n is a quantity of the disturber lines, f is a frequency, a and b are upstream power back-off (UPBO) parameters determined by an operator, and $L_0$ is a loop length of the victim line.

8. The apparatus of claim 7, wherein a 99 percent worst-case FEXT PSD in the victim line from a disturbing line i is obtained based on a transmitted PSD in the line i, $Tx\_PSD_i$, wherein the transmitted PSD is determined by $$Tx\_PSD_i(f) = (-a - b\sqrt{f}) - 20 \times \log_{10}|H(f,L_i)|,$$

where $L_i$ is a loop length of the line i, and H(f) is a transfer function of the line i.

9. The apparatus of claim 8, wherein a 99 percent worst-case FEXT PSD in the victim line from the line i is determined by $$FEXT_{0,i}(f) = 10 \times \log_{10}(k \times L_i \times f^2) + (-a - b\sqrt{f}) \leq$$
$$10 \times \log_{10}(k \times L_0 \times f^2) + (-a - b\sqrt{f}),$$

where $L_i$ is less than or equal to about $L_0$.

10. The apparatus of claim 8, wherein a 99 percent worst-case FEXT PSD in the victim line from the line i is determined by $$FEXT_{0,i}(f) = 10 \times \log_{10}(k \times L_0 \times f^2) + 20 \times \log_{10}|H(f, L_0)| +$$
$$20\log_{10}|H(f, L_t - L_0)| + (-a - b\sqrt{f} - 20\log_{10}|H(f, L_i)|)$$
$$= 10 \times \log_{10}(k \times L_0 \times f^2) + (-a - b\sqrt{f}),$$

where $L_i$ is greater than about $L_0$.

11. An apparatus comprising:
at least one processor configured to:
obtain an upper bound for a worst-case far-end crosstalk (FEXT) power spectral density (PSD) for a victim line in a plurality of subscriber lines;
obtain a receiver-referred virtual noise PSD based on the upper bound; and
determine a bit-loading for the victim line based on the receiver-referred virtual noise PSD or a scaled version of the receiver-referred virtual noise PSD,
wherein the receiver-referred virtual noise PSD, REFVN_dB, is obtained by $$REFVN\_dB = 20 \times \log_{10} f + (-a - b\sqrt{f}) + \text{scaling\_factor\_1},$$

where f is a frequency, a and b are upstream power back-off (UPBO) parameters determined by an operator, and scaling_factor_1 is a noise scaling factor.

12. The apparatus of claim 11, wherein the receiver-referred virtual noise PSD is based on a plurality of transmitted PSDs in a plurality of disturbing lines that introduce FEXT in the victim line, and wherein the receiver-referred virtual noise PSD is used to obtain a received virtual noise PSD in the victim line.

13. The apparatus of claim 12, wherein the received virtual noise PSD, Received_Virtual_Noise_PSD, is determined by Received_Virtual_Noise_*PSD* =*REFVN*_dB +Scaling_Factor, where Scaling_Factor is a CO-MIB parameter.

14. An apparatus comprising:
at least one processor configured to:
obtain an upper bound for a worst-case far-end crosstalk (FEXT) power spectral density (PSD) for a victim line in a plurality of subscriber lines:
obtain a receiver-referred virtual noise PSD based on the upper bound; and determine a bit-loading for the victim line based on the receiver-referred virtual noise PSD or a scaled version of the receiver-referred virtual noise PSD,
wherein the receiver-referred virtual noise PSD, REFVN_dB, is obtained by $$REFVN = f^2 \times 10^{\frac{-a-b\sqrt{f}+scaling\_factor\_1}{10}} + \text{extrinsic\_noise\_PSD},$$
$$REFVN\_dB = 10 \times \log_{10} REFVN$$

where f is a frequency, a and b are constants determined by an operator, and scaling factor 1 is a noise scaling factor.

15. A method comprising:
equalizing, by an equalizer a far-end crosstalk (FEXT) power spectral density (PSD) in a plurality of subscriber lines; and
adjusting a referred virtual noise PSD in the subscriber lines to match the equalized FEXT PSD,
wherein the FEXT PSD is equalized using an upstream power back-off (UPBO) mask, UPBOMASK, for each line of the subscriber lines, wherein the UPBO mask in decibal (dB) is determined by $$UPBOMASK(kl_0) = UPBOPSD(f) \times LOSS(kl_0, f) + 3.5,$$

where $kl_0$ is an electrical lenth of the line, $LOSS(kl_0,f)$ is a power loss factor, UPBOPSD(f) is a UPBO PSD corresponding to the line and f is the frequency.

16. The method of claim 15, wherein the subscriber lines have different loop lengths, wherein the equalized FEXT PSD and the adjusted referred virtual noise PSD are substantially independent of the loop lengths of the subscriber lines, and wherein the referred virtual noise. PSD matches the equalized FEXT for the different loop lengths.

17. The method of claim 16, wherein the subscriber lines comprise relatively short loops and relatively long loops, and wherein the adjusted referred virtual noise PSD prevents overprotection of the relatively shorter loops and under-protection of the relatively longer loops.

* * * * *

UNITED STATES PATENT AND TRADEMARK OFFICE
CERTIFICATE OF CORRECTION

PATENT NO. : 8,406,416 B2
APPLICATION NO. : 12/650781
DATED : March 26, 2013
INVENTOR(S) : Wei et al.

Page 1 of 2

It is certified that error appears in the above-identified patent and that said Letters Patent is hereby corrected as shown below:

In the Claims

Column 11, claim 1, should read as:
1. An apparatus comprising:
    a processor configured to obtain an upper bound for a worst-case far-end crosstalk (FEXT) power spectral density (PSD) for a victim line in a plurality of subscriber lines, wherein obtaining the upper bound for the worst-case FEXT PSD comprises determining a 99 percent worst-case FEXT PSD in the victim line from a plurality of disturbing lines, $FEXT_{0,i}$, by $$FEXT_{0,i}(f) \leq \left| 10 \times \log_{10}(k \times n^{0.6} \times f^2) + (-a - b\sqrt{f}) \right| + 10 \times \log_{10} L_0,$$

where $k$ is a FEXT coupling constant, $n$ is a quantity of the disturber lines, $f$ is a frequency, $a$ and $b$ are upstream power back-off (UPBO) parameters determined by an operator, and $L_0$ is a loop length of the victim line; and
    a transmitter configured to transmit a digital subscriber line (DSL) signal in the victim line according to a reference virtual noise power spectral density (PSD),
        wherein the reference virtual noise PSD is based on the upper bound.

Column 11, claim 5, should read as:
5. The apparatus of claim 1, wherein a VDSL2 transceiver unit at the operator's end of the line (VTU-O) is coupled to the line and is configured to receive the DSL signal and determine a received virtual noise PSD corresponding to the receiver-referred virtual noise PSD.

Column 11, claim 7, to Column 12, line 16, should read as:
7. An apparatus comprising:
    at least one processor configured to:
    obtain an upper bound for a worst-case far-end crosstalk (FEXT) power spectral density (PSD) for a victim line in a plurality of subscriber lines;

Signed and Sealed this
Twenty-fifth Day of February, 2014

Michelle K. Lee
*Deputy Director of the United States Patent and Trademark Office* obtain a receiver-referred virtual noise PSD based on the upper bound; and determine a bit-loading for the victim line based on the receiver-referred virtual noise PSD or a scaled version of the receiver-referred virtual noise PSD, wherein obtaining the upper bound for the worst-case FEXT PSD comprises determining a 99 percent worst-case FEXT PSD in the victim line from a plurality of disturbing lines, $FEXT_{0,i}$, by $$FEXT_{0,j}(f) \leq \left|10 \times \log_{10}(k \times n^{0.6} \times f^2) + (-a - b\sqrt{f})\right| + 10 \times \log_{10} L_0,$$

where $k$ is a FEXT coupling constant, $n$ is a quantity of the disturber lines, $f$ is a frequency, $a$ and $b$ are upstream power back-off (UPBO) parameters determined by an operator, and $L_0$ is a loop length of the victim line.

Column 13, claim 14, should read as:

14. An apparatus comprising:
   at least one processor configured to:
   obtain an upper bound for a worst-case far-end crosstalk (FEXT) power spectral density (PSD) for a victim line in a plurality of subscriber lines;
   obtain a receiver-referred virtual noise PSD based on the upper bound; and
determine a bit-loading for the victim line based on the receiver-referred virtual noise PSD or a scaled version of the receiver-referred virtual noise PSD,
   wherein the receiver-referred virtual noise PSD, REFVN_dB, is obtained by $$REFVN = f^2 \times 10^{\frac{-a - b\sqrt{f} + scaling\_factor\_1}{10}} + extrinsic\_noise\_PSD,$$

$$REFVN\_dB = 10 \times \log_{10} REFVN$$

where $f$ is a frequency, $a$ and $b$ are constants determined by an operator, and scaling_factor_1 is a noise scaling factor.

Column 14, claim 15, should read as:

15. A method comprising:
   equalizing a far-end crosstalk (FEXT) power spectral density (PSD) in a plurality of subscriber lines; and
   adjusting a referred virtual noise PSD in the subscriber lines to match the equalized FEXT PSD,
   wherein the FEXT PSD is equalized using an upstream power back-off (UPBO) mask, UPBOMASK, for each line of the subscriber lines, wherein the UPBO mask in decibel (dB) is determined by $$UPBOMASK(kl_0) = UPBOPSD(f) + LOSS(kl_0, f) + 3.5,$$

where $kl_0$ is an electrical length of the line, $LOSS(kl_0, f)$ is a power loss factor, $UPBOPSD(f)$ is a UPBO PSD corresponding to the line, and $f$ is the frequency.